United States Patent
Chen et al.

(10) Patent No.: US 7,847,895 B2
(45) Date of Patent: Dec. 7, 2010

(54) LIQUID CRYSTAL DISPLAY DEVICE

(75) Inventors: Xin-Sheng Chen, Shenzhen (CN); Guo-Hua Yu, Shenzhen (CN)

(73) Assignees: Innocom Technology (ShenZhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 1 day.

(21) Appl. No.: 11/906,439

(22) Filed: Oct. 1, 2007

(65) Prior Publication Data
US 2008/0106680 A1    May 8, 2008

(30) Foreign Application Priority Data
Sep. 29, 2006    (TW) ............... 95136311 A

(51) Int. Cl.
*G02F 1/1347* (2006.01)
*G02F 1/1335* (2006.01)
*G02F 1/1343* (2006.01)

(52) U.S. Cl. ............ 349/114; 349/42; 349/74; 349/106; 349/149; 349/158

(58) Field of Classification Search .......... 349/74, 349/77, 78, 106, 113, 114, 149, 150, 187, 349/42, 80, 158; 345/88
See application file for complete search history.

(56) References Cited

U.S. PATENT DOCUMENTS

| | | | |
|---|---|---|---|
| 5,726,723 A | 3/1998 | Wang et al. | |
| 6,501,521 B2 | 12/2002 | Matsushita et al. | |
| 7,019,803 B2 | 3/2006 | Ashida et al. | |
| 2002/0024802 A1* | 2/2002 | Chikawa et al. | 361/809 |
| 2002/0140887 A1* | 10/2002 | Maeda et al. | 349/113 |
| 2004/0113162 A1* | 6/2004 | Mai | 257/88 |

* cited by examiner

*Primary Examiner*—David Nelms
*Assistant Examiner*—Tai Duong
(74) *Attorney, Agent, or Firm*—Wei Te Chung

(57) ABSTRACT

An exemplary transflective liquid crystal display device (2) has a liquid crystal panel (20), and a backlight module (29) adjacent to the liquid crystal panel. The liquid crystal panel includes a first color filter substrate (210), a thin film transistor substrate (220), a second color filter substrate (230), a first liquid crystal layer (240) being provided between the first color filter substrate and the TFT substrate, and a second liquid crystal layer (250) being provided between the second color filter substrate and the TFT substrate.

12 Claims, 3 Drawing Sheets

LIQUID CRYSTAL DISPLAY DEVICE

CROSS-REFERENCE TO RELATED APPLICATION

This application is related to and claims the benefit of a foreign priority application filed in Taiwan as Serial No. 095136311 on Sept. 29, 2006. The related application is incorporated herein by reference.

The present invention relates to liquid crystal displays (LCDs), and especially to a transflective liquid crystal display device.

BACKGROUND

LCD devices have the advantages of portability, low power consumption, and low radiation, and because of this they have been widely used in various portable information products such as notebooks, personal digital assistants (PDAs), video cameras, and the like. Furthermore, LCD devices are considered to have the potential to completely replace CRT (cathode ray tube) monitors and televisions.

A transmissive LCD device displays images using light from a back light device, and is usable under any ambient light conditions. Because the transmissive LCD device requires a back light having high brightness, it has high power consumption. Further, the back light device can not be used for a long time.

Unlike the transmissive LCD device, a reflective LCD device utilizes ambient light beams from a natural light source or from an external artificial light source. The reflective LCD device can be used for a long time. However, the reflective LCD device is useless when the weather is unfavorable or when the external light source is not available.

To overcome the problems described above, a transflective LCD device has been developed. The transflective LCD device can compensate for the respective shortcomings of the reflective LCD device and the transmissive LCD device. That is, the transflective LCD device can selectively provide a reflective or transmissive mode, depending on the prevailing needs of users.

FIG. 7 is a schematic cross-sectional view of part of a conventional transflective LCD device 10. The transflective LCD device 10 includes a color filter substrate (not labeled), a thin film transistor (TFT) substrate (not labeled), and a liquid crystal layer 8 between the color filter substrate and the TFT substrate, and a back light module 18 disposed below the TFT substrate. The color filter substrate includes a first glass substrate 4, a color filter 5, a first electrode layer 6 and a first aligning film 7, formed in that order from top to bottom. The TFT substrate has a second aligning film 17, a second electrode layer 16, and a second glass substrate 14, formed in that order from top to bottom. The second electrode layer 16 defines a reflective region 161 and a transmission region 162, which is used for the LCD device 10 working in reflective mode and transmissive mode.

In the reflective mode, an ambient light ray from an external light source such as natural sunlight passes through the color filter 5, the first electrode layer 6, the first aligning film 7, the liquid crystal layer 8, the second aligning film 17 in that order, and is then reflected by the reflective region 161 of the second electrode layer 16 to pass back through the second aligning film 17, the liquid crystal layer 8, the first aligning film 7, the first electrode layer 6, and the color filter 5 in that order. That is the ambient light ray passes through the color filter 5 twice.

In the transmissive mode, light beams from the backlight module 18 transmit through the transmission region 162 of the second electrode layer 16, the second aligning film 17, the liquid crystal layer 8, the first aligning film 7, the first electrode layer 6, and the color filter 5 in that order. That is the ambient light ray passes through the color filter 5 once.

Because the light beams passes through the color filter 5 twice when the LCD device 10 works in the reflective mode, and the light beams passes through the color filter 5 once when the LCD device 10 works in the transmissive mode, the reflective mode has a better color purity than the transmissive mode in the transflective LCD device 10. That is, there is a difference in color purity as between the reflective mode and the transmissive mode.

What is needed, is an LCD device that can overcome the above-described deficiencies.

SUMMARY

In one preferred embodiment, an exemplary transflective liquid crystal display device has a liquid crystal panel, and a backlight module adjacent to the second color filter substrate. The liquid crystal panel includes a first color filter substrate, a thin film transistor substrate, a second color filter substrate, a first liquid crystal layer being provided between the first color filter substrate and the TFT substrate, and a second liquid crystal layer being provided between the second color filter substrate and the TFT substrate.

Other advantages and novel features will become more apparent from the following detailed description of preferred embodiments when taken in conjunction with the accompanying drawings.

DETAILED DESCRIPTION OF PREFERRED EMBODIMENTS

Reference will now be made to the drawings to describe the preferred embodiments in detail.

Figure 1:
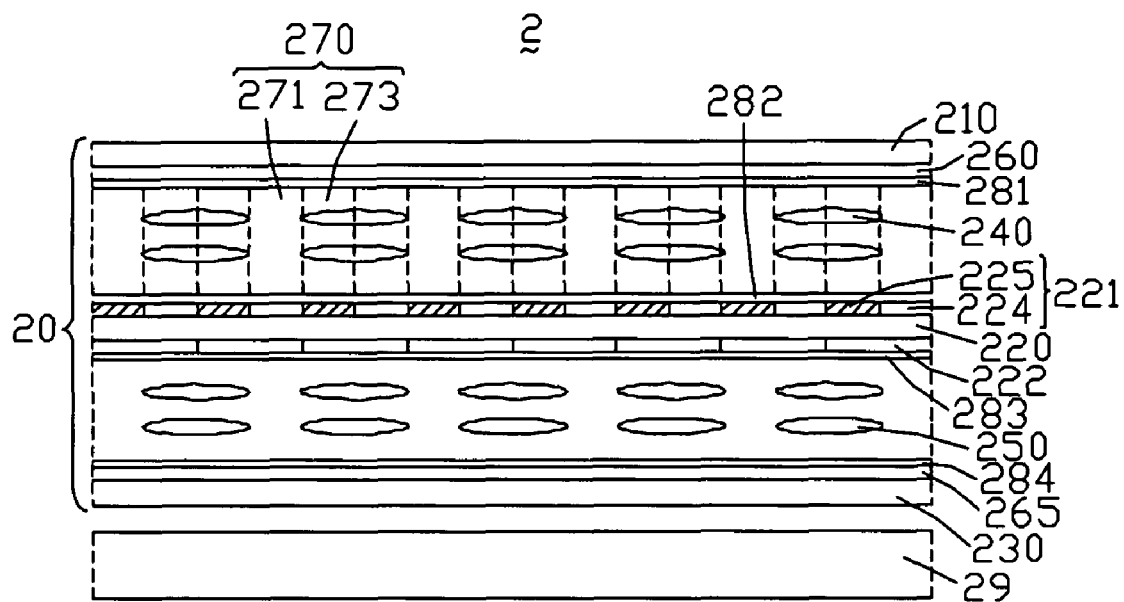
FIG. 1 is a side, cross-sectional view of a transflective LCD device according to a first embodiment of the present invention.

Referring to FIG. 1, a transflective liquid crystal display (LCD) device 2 according to a first embodiment of the present invention is shown. The LCD device 2 includes a liquid crystal panel 20 and a backlight module 29 below the liquid crystal panel 20, for providing light beams to the liquid crystal panel 20.

The liquid crystal panel 20 includes a first color filter substrate 210, a thin film transistor (TFT) substrate 220, and a second color filter substrate 230. A first liquid crystal layer 240 is provided between the first color filter substrate 210 and the TFT substrate 220, and a second liquid crystal layer 250 is provided between the second color filter substrate 230 and the TFT substrate 220. The first and the second liquid crystal layers 240, 250 have a substantially same thickness.

Each of the first and second color filter substrates 210, 230 has a color filter layer (not shown). The two color filter layers each have a plurality of color units, having a substantially same arrangement and corresponding to each other. In addition, two out surfaces of the first and second color filter substrates 210, 230 respectively have a polarizer (not shown) disposed thereat, which polarizing axles are perpendicular to each other.

The first color filter substrate 210 further has a first common electrode layer 260 and a first aligning film 281, which are disposed at an inner surface of the first color filter substrate 210 in that order from top to bottom, adjacent to the first liquid crystal layer 240. The second color filter substrate 230 further has a second common electrode layer 265 and a fourth aligning film 284, which are disposed at an inner surface of the second color filter substrate 230 in that order from bottom to top, adjacent to the second liquid crystal layer 250. The first and the fourth aligning films 281, 284 have a same aligning direction.

The TFT substrate 220 has two thin film transistor arrays, respectively disposed at two opposite surfaces of the TFT substrate 220. The two thin film transistor arrays have a substantially same arrangement. The TFT substrate 220 has a first pixel electrode layer (not labeled) and a second aligning film 282, disposed at an external surface thereof adjacent to the first liquid crystal layer 240, and further has a second pixel electrode layer (not labeled) and a third aligning film 283, disposed at an external surface thereof adjacent to the second liquid crystal layer 250. The second and the third aligning films 282, 283 have a same aligning direction. The first pixel electrode layer includes a plurality of first pixel electrode units 221. Each first pixel electrode unit 221 is a transflective electrode, having a transmission region 224 and a reflective region 225 alternately disposed thereof. When a voltage is provided thereat, the first pixel electrode layer and the first common electrode layer 260 can form an electrical field to control the rotation of the first liquid crystal layer 240 to realize the image display. The second pixel electrode layer has a plurality of second pixel units 222, each of which is a transparent pixel electrode. When a voltage is provided thereat, the second pixel electrode layer and the second common electrode layer 265 can form an electrical field to control the rotation of the second liquid crystal layer 250 to realize the image display.

The first color filter substrate 210, the TFT substrate 220, and the first liquid crystal layer 240 therebetween define a plurality of pixel regions 270. Each pixel region 270 has a transmissive region 271, corresponding to the transmission region 224 of the first pixel electrode unit 221, and a reflective region 273, corresponding to the reflective region 225 of the first pixel electrode unit 221.

When ambient light rays are enough, the transflective LCD device 20 works in a reflective mode. The external light rays pass through the first color filter substrate 210 and the first liquid crystal layer 240, and then are reflected by the reflective region 225 to pass back through the first liquid crystal layer 240, and the first color filter substrate 210 to realize the image display. Thus the external light rays transmit through the first color filter substrate 210 twice. When ambient light rays are insufficient, the transflective LCD device 20 works in a transmissive mode. The transflective LCD device 20 utilizes the backlight module 29 to provide light beams to the liquid crystal panel 20. The light beams from the backlight module 29 transmit through the second color filter substrate 230, the second liquid crystal layer 250, the TFT substrate 220, the first liquid crystal layer 240 and the first color filter substrate 210 in that order to realize the image display. The light beams thereof respectively transmit through the first and the second color filter substrates 210, 230, that is the light beams passes through two color filter substrates. Because the first and the second color filter substrates 210, 230 have a same arrangement of color filter layers thereof, and the TFT substrate 220 has two same arrangement of the two TFT arrays disposed at two opposite external surface of the TFT substrate 220, and the first and the second liquid crystal layers 240, 250 have a same thickness, and the first and the fourth aligning films 281, 284 have a same aligning direction, and the second and the third aligning films 282, 283 have a same aligning direction, the light beams respectively work in the reflective mode and the transmissive mode have a same optical path. Thus, the two light beams respectively working in the reflective mode and the transmissive mode have a substantially same color purity.

Figure 2:
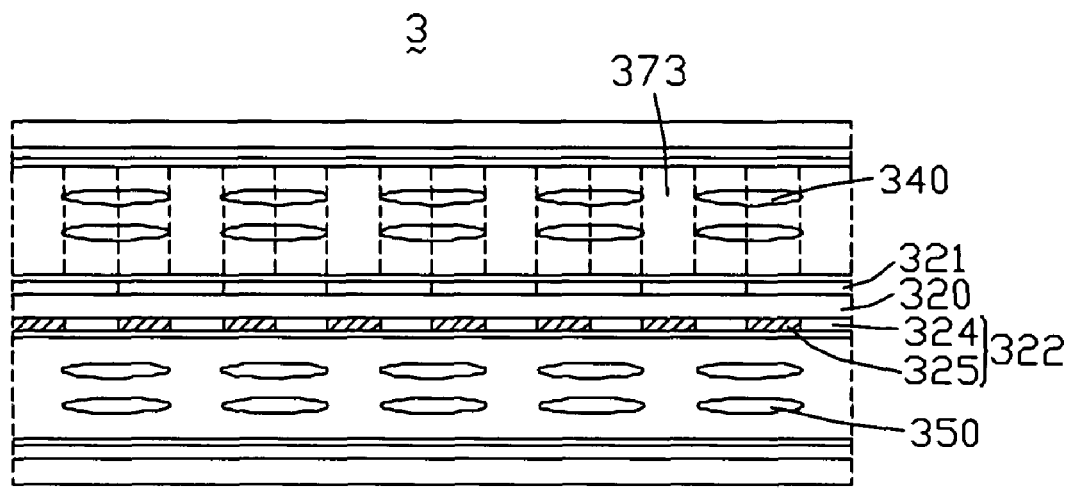
FIG. 2 is a side, cross-sectional view of a transflective LCD device according to a second embodiment of the present invention.

Referring to FIG. 2, a side, cross-sectional view of a transflective LCD device 3 according to a second embodiment of the present invention is shown. The transflective LCD device 3 has a similar structure to that of the transflective LCD device 2 except that a first pixel electrode unit 321 of a TFT substrate 320, adjacent to a first liquid crystal layer 340 is a transparent electrode, and a second pixel electrode unit 322 of the TFT substrate 320, adjacent to a second liquid crystal layer 350 is transflective electrode. Each transflective pixel electrode has a transmissive region 324 and a reflective region 325, the reflective region 325 corresponding to a reflective region 373.

Figure 3:
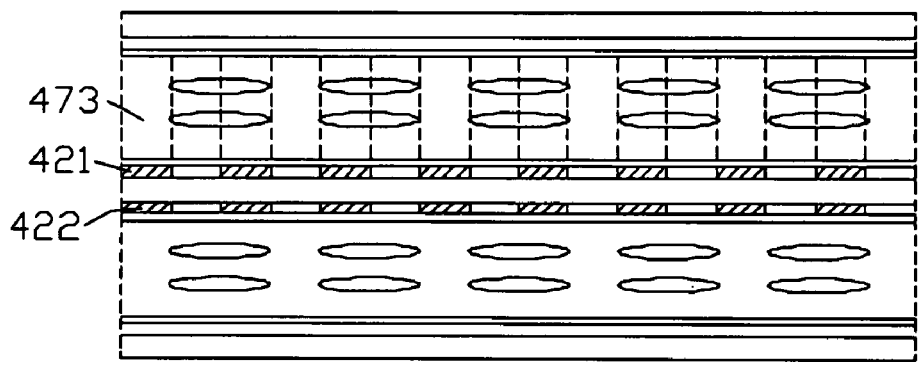
FIG. 3 is a side, cross-sectional view of a transflective LCD device according to a third embodiment of the present invention.

FIG. 3 is a side, cross-sectional view of a transflective LCD device 4 according to a third embodiment of the present invention. The transflective LCD device 4 has a similar structure to that of the transflective LCD device 2 except that in each pixel region (not labeled), a first pixel electrode unit 421 and a second pixel electrode unit 422 both are transflective electrodes. Each of the first pixel electrode unit and the second pixel electrode unit has a transmissive region (not labeled) and a reflective region (not labeled), with the reflective region corresponding to a reflective region 473.

Figure 4:
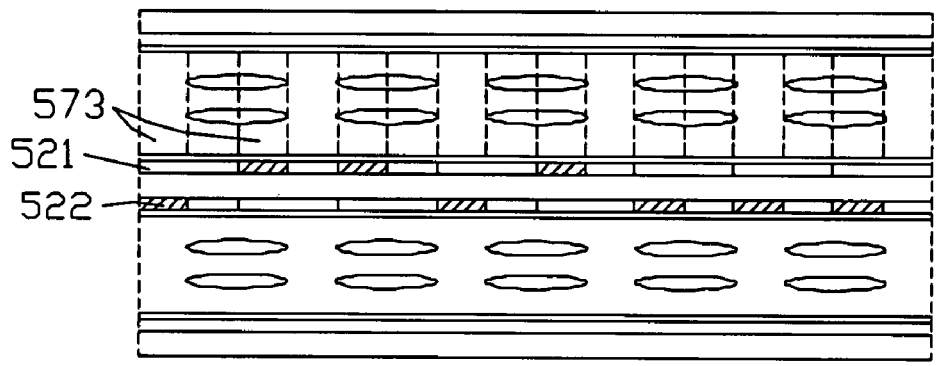
FIG. 4 is a side, cross-sectional view of a transflective LCD device according to a fourth embodiment of the present invention.

FIG. 4 is a side, cross-sectional view of a transflective LCD device 5 according to a fourth embodiment of the present invention. The transflective LCD device 5 has a similar structure to that of the transflective LCD device 2 except that a part of a first color filter electrode unit 521 is a transparent electrode, and the other part of the first color filter electrode unit 521 is a transflective pixel electrode, and a part of a second color filter electrode unit 522 is a transflective electrode, and the other part of the second color filter electrode unit 522 is a transparent electrode. In addition, the transparent electrode of the first color filter electrode unit 521 corresponds to the transflective electrode of the second color filter electrode unit 522, and the transflective electrode of the first color filter electrode unit 521 corresponds to the transparent electrode of the second color filter electrode unit 522.

Figure 5:
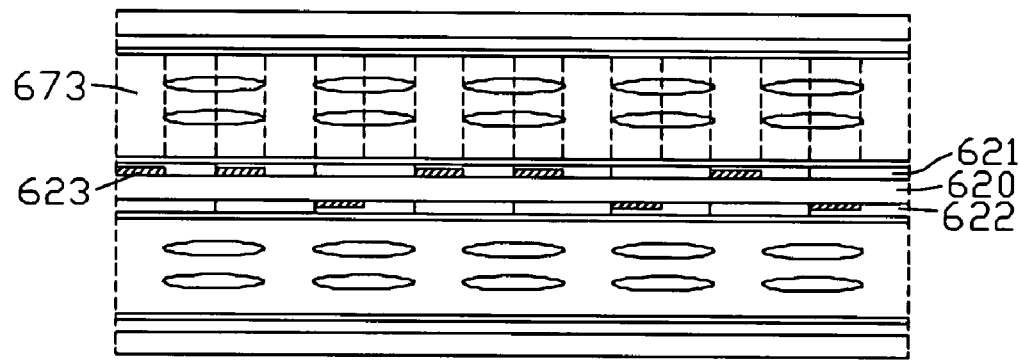
FIG. 5 is a side, cross-sectional view of a transflective LCD device according to a fifth embodiment of the present invention.

FIG. 5 is a side, cross-sectional view of a transflective LCD device according to a fifth embodiment of the present invention. The transflective LCD device 6 has a similar structure to that of the transflective LCD device 2 except that a first color filter electrode unit 621 and a second color filter electrode unit 622 are both transparent electrode, and a reflective layer 623 is provided between a TFT substrate 620 and the at least one of the first color filter electrode unit 621 and the second color filter electrode unit 622. The reflective layer 623 corresponds to a reflective region 673.

Figure 6:
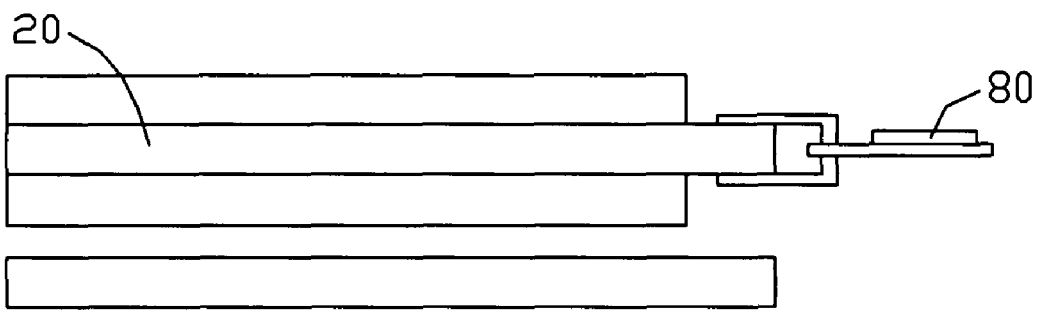
FIG. 6 is a side, cross-sectional view of a transflective LCD device according to a sixth embodiment of the present invention.
Figure 7:
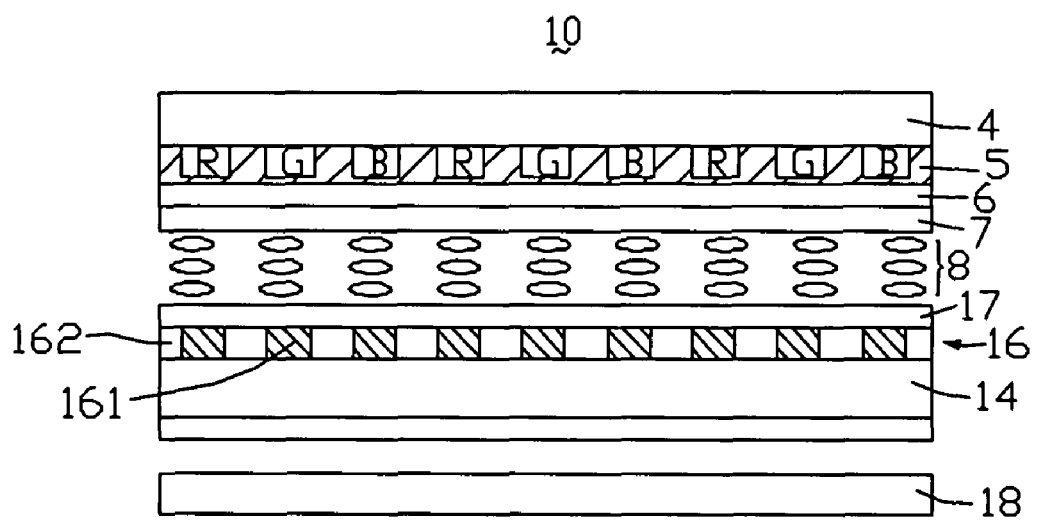
FIG. 7, is a side, cross-sectional view of a conventional transflective LCD device.

Further or alternative embodiments may include the followings. In one example, a reflective layer can be disposed between a pixel electrode and an aligning film. In further example, a transflective film is provided at least one of the external surfaces of the TFT substrate. The reflective region corresponds to a reflective part of the transflective film. That is the LCD device utilizes the reflective part of the transflective film to realize working in the reflective mode, instead of the transflective electrode and the reflective layer. FIG. 6 is a side, cross-sectional view of a transflective LCD device according to a sixth embodiment of the present invention. The transflective LCD device utilizes chip on film (COF) method to combine a driver integrated circuit (IC) to the liquid crystal panel 20, for controlling the rotation of the first and the second liquid crystal layers.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A transflective liquid crystal display device, comprising:
    a liquid crystal panel, which comprises a first color filter substrate, a thin film transistor (TFT) substrate, a second color filter substrate, a first liquid crystal layer being provided between the first color filter substrate and the TFT substrate, and a second liquid crystal layer being provided between the second color filter substrate and the TFT substrate; and
    a backlight module adjacent to the second color filter substrate;
    wherein the TFT substrate comprises a first pixel electrode layer, disposed at an external surface thereof adjacent to the first liquid crystal layer, and further comprises a second pixel electrode layer, disposed at an external surface thereof adjacent to the second liquid crystal layer, the first pixel electrode layer comprising a plurality of first pixel electrode units, and the second pixel electrode layer comprising a plurality of second pixel electrode units, at least one of the first pixel electrode units and the second pixel electrode units is a transflective electrode, the transflective electrode having a transmission region and a reflective region alternately disposed thereof 2. The transflective liquid crystal display device as claimed in claim 1, wherein each of the first pixel electrode units is a transflective electrode, the transflective electrode having a transmission region and a reflective region alternately disposed thereof, and each of the second pixel electrode units is a transparent pixel electrode.

3. The transflective liquid crystal display device as claimed in claim 1, wherein each of the second pixel electrode units is a transflective electrode, the transflective electrode having a transmission region and a reflective region alternately disposed thereof, and each of the first pixel units is a transparent pixel electrode.

4. The transflective liquid crystal display device as claimed in claim 1, wherein each of the first and second pixel electrode units is a transflective electrode, the transflective electrode having a transmission region and a reflective region alternately disposed thereof.

5. The transflective liquid crystal display device as claimed in claim 1, wherein the first and the second liquid crystal layers have a substantially same thickness.

6. The transflective liquid crystal display device as claimed in claim 1, wherein the first and the second color filter substrates have a same arrangement of color filter layers thereof, and the TFT substrate has two same arrangements of two TFT arrays disposed at two opposite external surfaces of the TFT substrate, respectively.

7. The transflective liquid crystal display device as claimed in claim 6, wherein the first color filter substrate further has a first common electrode layer, and a first aligning film, disposed at an inner surface of the first color filter substrate in that order from top to bottom, adjacent to the first liquid crystal layer, the second color filter substrate further has a second common electrode layer, and a fourth aligning film, disposed at an inner surface of the second color filter substrate in that order from bottom to top, adjacent to the second liquid crystal layer, and the TFT substrate further has a second aligning film, disposed at an external surface thereof adjacent to the first liquid crystal layer, and still further has a third aligning film, disposed at an external surface thereof adjacent to the second liquid crystal layer.

8. The transflective liquid crystal display device as claimed in claim 7, wherein the second and the third aligning films have a same aligning direction, and the first and the fourth aligning films have a same aligning direction.

9. The transflective liquid crystal display device as claimed in claim 8, wherein when ambient light rays are enough, the transflective LCD device works in a reflective mode, such that the ambient light rays pass through the first color filter substrate and the first liquid crystal layer, and then are reflected by the reflective region to pass back through the first liquid crystal layer and the first color filter substrate to realize image display, and when ambient light rays are insufficient, the transflective LCD device works in a transmissive mode, such that the light beams from the backlight module transmit through the second color filter substrate, the second liquid crystal layer, the TFT substrate, the first liquid crystal layer and the first color filter substrate in that order to realize image display.

10. The transflective liquid crystal display device as claimed in claim 1, further comprising a driver integrated circuit (IC) combined on the liquid crystal panel through a chip on film method to realize control of the first and the second liquid crystal layers.

11. A method of providing a constant color purity of image display of a liquid crystal display (LCD) device, comprising:
    providing a liquid crystal panel with a first color filter substrate, a thin film transistor (TFT) substrate, a second color filter substrate, a first liquid crystal layer being provided between the first color filter substrate and the TFT substrate, and a second liquid crystal layer being provided between the second color filter substrate and the TFT substrate, the TFT substrate comprising a plurality of first pixel electrode units disposed at an external surface thereof adjacent to the first liquid crystal layer, and a plurality of second electrode units disposed at an external surface thereof adjacent to the second liquid crystal layer, at least one of the first pixel electrode units and the second pixel electrode units being a transflective electrode, and the transflective electrode comprising a transmission region and a reflective region alternately disposed thereof; and a backlight module adjacent to the second color filter substrate;
    wherein when ambient light rays are enough, thus having the LCD work in a reflective mode, said ambient light rays transmit through the first color filter twice before realizing said image display; and when said ambient light rays are insufficient, thus having the LCD work in a transmissive mode, light rays from the backlight module transmit through each of the second color filter and the first color filter once before realizing said image display.

12. A method of providing a constant color purity of image display of a liquid crystal display (LCD) device, comprising:

providing a liquid crystal panel with a first color filter substrate with an associated first liquid crystal, a thin film transistor substrate, and a second color filter substrate with an associated second liquid crystal, wherein the first color filter substrate with the associated first liquid crystal and the second color filter substrate with the associated second liquid crystal are mutually symmetrically arranged by two sides of the thin film transistor substrate, the TFT substrate comprises a plurality of first pixel electrode units disposed at an external surface thereof adjacent to the first liquid crystal layer, and a plurality of second electrode units disposed at an external surface thereof adjacent to the second liquid crystal layer, at least one of the first pixel electrode units and the second pixel electrode units is a transflective electrode, and the transflective electrode comprises a transmission region and a reflective region alternately disposed thereof, and a backlight module is located adjacent to the second color filter substrate;

wherein when ambient light rays are enough, thus having the LCD work in a reflective mode, said ambient light rays transmit through the first color filter twice before realizing said image display; and when said ambient light rays are insufficient, thus having the LCD work in a transmissive mode, light rays from the backlight module transmit through each of the second color filter and the first color filter once before realizing said image display.

* * * * *